United States Patent
Fuchsenthaler

(10) Patent No.: US 8,630,486 B2
(45) Date of Patent: Jan. 14, 2014

(54) METHOD FOR ANALYSIS OF COLOR SEPARATIONS

(75) Inventor: Kurt Fuchsenthaler, Neckargemuend (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 60 days.

(21) Appl. No.: 12/966,317

(22) Filed: Dec. 13, 2010

(65) Prior Publication Data

US 2011/0142332 A1 Jun. 16, 2011

(30) Foreign Application Priority Data

Dec. 11, 2009 (DE) .......... 10 2009 057 972

(51) Int. Cl.
*G06K 9/00* (2006.01)

(52) U.S. Cl.
USPC .......... 382/162; 358/1.9; 358/3.26; 358/518; 358/406

(58) Field of Classification Search
USPC ............ 382/162; 358/1.9, 3.26, 518, 406
See application file for complete search history.

(56) References Cited

U.S. PATENT DOCUMENTS

| | | | | |
|---|---|---|---|---|
| 5,696,890 A * | 12/1997 | Geissler et al. | ............... | 358/1.9 |
| 6,542,180 B1 * | 4/2003 | Wasserman et al. | ........... | 348/131 |
| 6,567,559 B1 * | 5/2003 | Easwar | ........... | 382/239 |
| 7,262,880 B2 | 8/2007 | Geissler et al. | | |
| 7,307,755 B2 * | 12/2007 | Delang et al. | ............... | 358/1.9 |
| 7,515,267 B2 | 4/2009 | Ehbets et al. | | |
| 7,515,301 B2 * | 4/2009 | Gembe | ............... | 358/1.9 |
| 7,724,922 B2 * | 5/2010 | Furukawa et al. | ............ | 382/112 |
| 7,830,549 B2 * | 11/2010 | Huber et al. | ............... | 358/1.9 |
| 7,894,065 B2 * | 2/2011 | Kohlbrenner et al. | ........ | 356/402 |
| 2002/0104457 A1 * | 8/2002 | Brydges et al. | ............... | 101/484 |
| 2003/0210413 A1 | 11/2003 | Takeda et al. | | |
| 2004/0150848 A1 * | 8/2004 | Delang et al. | ............... | 358/1.9 |
| 2004/0250723 A1 * | 12/2004 | Buck | ............. | 101/484 |
| 2005/0206932 A1 * | 9/2005 | Gembe | ............... | 358/1.9 |
| 2006/0170996 A1 * | 8/2006 | Headley et al. | ............... | 358/518 |
| 2006/0238803 A1 * | 10/2006 | Kuroshima | ............... | 358/1.15 |
| 2007/0079717 A1 * | 4/2007 | De Vries et al. | ............... | 101/484 |
| 2007/0199463 A1 * | 8/2007 | Schonert | ............... | 101/365 |
| 2010/0135583 A1 * | 6/2010 | Park | ............... | 382/199 |
| 2010/0141823 A1 * | 6/2010 | Tsunekawa et al. | ...... | 348/333.12 |
| 2010/0194392 A1 * | 8/2010 | Torheim et al. | ............... | 324/318 |

FOREIGN PATENT DOCUMENTS

DE 102009007864 A1 9/2009

OTHER PUBLICATIONS

German Search Report dated Sep. 1, 2010.

* cited by examiner

*Primary Examiner* — Stephen R Koziol
*Assistant Examiner* — Shaghayegh Azima
(74) *Attorney, Agent, or Firm* — Laurence A. Greenberg; Werner H. Stemer; Ralph E. Locher

(57) ABSTRACT

A method for registering color deviations on printing materials produced in machines processing printing material, includes using a computer to analyze image data from a prepress stage with regard to coloring in a printed image on the printing materials. During the analysis in the computer, the image data from the prepress stage are organized into image types, the image types are allocated set points and the set points are compared with actual values registered by a color measuring instrument on the printing materials being produced.

12 Claims, 4 Drawing Sheets

FIG. 3C
FIG. 3D
FIG. 3E
FIG. 3F
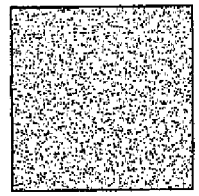
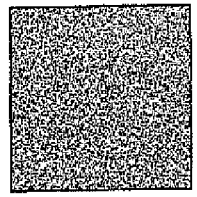
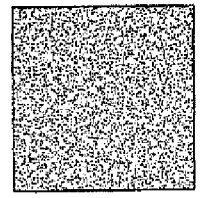
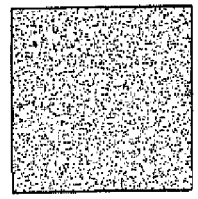
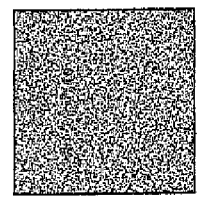
FIG. 3H
FIG. 3G

METHOD FOR ANALYSIS OF COLOR SEPARATIONS

CROSS-REFERENCE TO RELATED APPLICATION

This application claims the priority, under 35 U.S.C. §119, of German Patent Application DE 10 2009 057 972.9, filed Dec. 11, 2009; the prior application is herewith incorporated by reference in its entirety.

BACKGROUND OF THE INVENTION

Field of the Invention

The present invention relates to a method for registering color deviations on printing materials produced in machines processing printing material, in which a computer is used to analyze image data from a prepress stage with regard to coloring in a printed image on the printing materials.

In all printing processes, the aim is to reproduce the original print in a manner as true as possible to the original. It is substantially a matter, in particular, of maintaining the coloring of the original print. For this reason, the coloring of the printing materials produced must be monitored continually, for which purpose, at least at regular intervals, printing materials produced have to be removed from the printing press and measured through the use of a color measuring instrument. If color deviations with respect to the original print are determined, then control actions have to be taken in the inking units of the printing press in order to compensate for those color deviations in relation to the original print.

German Published, Non-Prosecuted Patent Application DE 10 2009 007 864 A1 discloses a method for the colorimetric measurement of printing materials in which a colorimetric analysis of the printed image to be applied to the printing material is carried out, through the use of a computer. During that colorimetric analysis of the printed image, a computer is used to determine regions in the printed image which do not require any test element for a colorimetric measurement. This means that, in those regions, no corresponding print control strip has to be applied at the side or in the printed image. Instead, in those non-critical regions, the colorimetric measurements by the color measuring instrument are made directly in the regions determined in the printed image itself. As a result of omitting test elements such as print control strips, space is saved, so that, if appropriate, more copies can be accommodated on a printing material than would be required with comprehensive print control strips for each copy in conventional copy printing. For that purpose, the colorimetric analysis must take place before the production of the printing plates, so that the data from the prepress stage is preferably subjected to the colorimetric analysis in the computer.

With the known prior art, it is thus possible to optimize the utilization of the printing material area in copy printing and to dispense with unnecessary test elements such as print control strips. However, the prior art also has the disadvantage that only a comparison with the measured actual color measured values and the associated reference color measured values from the original print takes place. Thus, no plausibility checks between individually registered actual color measured values are carried out, and it is also possible for reference color values actually of the same color in the original print to be allocated different set points in the color measuring instrument for the comparison with the actual color measured values. That then leads to the set points in the color measuring instrument which are compared with the actual color measured values that are present leading to different deviations when there is actually the same coloring in the original print.

SUMMARY OF THE INVENTION

It is accordingly an object of the invention to provide a method for analysis of color separations, which overcomes the hereinafore-mentioned disadvantages of the heretofore-known methods of this general type and which further automates the colorimetric measurement of printing materials.

With the foregoing and other objects in view there is provided, in accordance with the invention, a method for registering color deviations on printing materials produced in printing material processing machines having prepress stages. The method comprises registering actual values on the printing materials being produced with a color measuring instrument, analyzing image data from the prepress stage with regard to coloring in a printed image on the printing materials, with a computer, and during the analysis in the computer, organizing the image data from the prepress stage into image types, allocating set points to the image types and correspondingly comparing the set points with the actual values registered by the color measuring instrument on the printing materials being produced.

The method according to the invention is, in principle, suitable for use in all printing processes but is primarily used in offset printing. According to the present invention, the image data from the original print from the prepress stage is analyzed with respect to the coloring in the printed image, during this analysis a computer organizes the image data from the prepress stage into image types/image regions which are in each case allocated set points for the color measuring instrument for the comparison with the measured actual color measured values. These allocated set points are then compared with corresponding actual color measured values registered by a color measuring instrument on the printing materials produced, and deviations between allocated set points or setpoint values and registered actual values are compensated for, if appropriate through a control loop which acts on actuating drives in the inking units of the printing press. As a result of the organization of the image data from the original print from the prepress stage into image types/image regions, it is ensured that the same image types are allocated the same set points and not different set points, as is possibly the case in the prior art. During the image analysis, first of all the color separations for the printing plates are analyzed, with the image contents of the printed image being analyzed on the basis of the area coverages of the color separations outside any print control strips or other measured elements.

In accordance with another mode of the invention, suitable image types are, for example, regions such as bitmaps, homogenous color regions, homogenous half tones, homogenous full tones, overprinted homogenous full tones and CMYK bitmaps. In these organized regions, in each case at least in the homogenous color regions and half tones, a distinction is drawn in accordance with the corresponding colors, so that in this case, as far as possible, only absolutely identical regions are compared with one another and these identical regions are allocated identical set points for the color measuring instrument as a basis for the foundation of color control.

In accordance with a further mode of the invention, provision is made for the computer to use the analyzed image data and the organization into image types to perform an evaluation with regard to the setting of the dampening solution metering in a printing press producing the printing materials and, if necessary, to make a correction to the dampening solution metering. As a result of the organization into identical regions and image types, a particularly effective reference-actual value comparison of the coloring is possible. If, in the case of identical image types, different actual color measured values are registered despite identical ink metering, it is possible to conclude from this that the dampening solution metering is different, which likewise leads to deviating actual color measured values. If this analysis is carried out for all of the image types of the printed image on the printing material, then it is possible to obtain the dampening solution distribution over the printed image and, if appropriate, to make a correction to the dampening solution through the dampening solution control. For this purpose, the computer can automatically change and thus correct the dampening solution metering in the inking unit of the printing press.

In accordance with an added mode of the invention, provision is made for the image types in the computer to be allocated the correct set points, such as, for example, the matching printing ink, through the use of a comparison with values stored in a database. During the set point-actual value comparison of the color measured values registered by the color measuring instrument, it is substantially a matter of using the correct set points as the comparison reference. Since the coloring of the printing materials is determined by the printing inks used in the printing press, the set point-actual value comparison then functions particularly precisely if the matching printing ink is used as a comparison reference and thus as a set point. For this purpose, the prepress data from the original print must be compared with corresponding colors stored in a database, so that the correct color is used as set point. In this way, the printer can also be given a recommendation at the same time that he or she should actually use this printing ink during printing.

In accordance with an additional mode of the invention, provision is made for the computer to have a display device and for a menu for the allocation of set points for the image types determined to be displayed on the display device. In this case, the computer firstly organizes the image data into corresponding image types and then, for each image type, suggests set points in a menu. If an unambiguous allocation does not arise in this case, then a plurality of set points for each image type can also be suggested for selection. The operator of the printing press must then select one of the suggested set points for allocation in this case. Otherwise, he or she merely has to confirm the proposed set points from the menu, which are then used as set points for the color measurement. Provision can also be made for the allocation to be carried out automatically, at least in the case of the unambiguous allocation of set points, and for the operator to be displayed only those set points for allocation in which there are several alternatives. In this way, wrong entries by the printer during the set point allocation are minimized.

In accordance with yet another mode of the invention, provision is further made for the color measuring instrument to be a color measuring instrument measuring an area in order to register the printed image on printing materials. By using a color measuring instrument of this type, scanning the printed image of the printing material with registration of the entire area of the entire printed image is possible, so that all of the image regions of the printing material can be registered and compared with the allocated set points. The color measuring instrument can be disposed within the printing press as an in-line measuring instrument or outside the printing press as an online or off-line measuring instrument and is preferably connected directly to the computer, which also carries out the image analysis.

In accordance with yet a further mode of the invention, provision is made for the computer to have a display device, for the printed image to be displayed, at least schematically, on the display device and for the regions organized into image types to be emphasized through the use of markings on the display device. In this way, the operator of the printing press is displayed the organization into image types visually, so that the operator is himself or herself able to understand the organization by the computer. Thus, if appropriate, the operator can more easily check whether or not an error has possibly occurred during the organization by the computer. In addition, in this way it is made clear to the printer which organized image region is located where in the printed image and, during the allocation through a menu, he or she can see better which image region should currently be allocated a set point. This is important, in particular, when it is an image region with a bitmap, to which set points can only be allocated automatically with difficulty.

In accordance with a concomitant mode of the invention, it is also possible for homogenous image regions, in particular having CMYK colors, to be marked automatically from a given size and displayed in a list in accordance with the respectively largest frequency in the printed image on the printing material. In this way, the printer is immediately given an impression as to which homogenous image regions having CMYK colors occur most frequently in the printed image and thus substantially determine the coloring. These image regions are particularly important for true-to-the-original color reproduction and are thus emphasized visually for the printer.

Other features which are considered as characteristic for the invention are set forth in the appended claims.

Although the invention is illustrated and described herein as embodied in an analysis of color separations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3C shows homogeneous CMYK colors in the full tone;

FIG. 3D shows homogeneous special colors in the full tone;

FIG. 3E shows homogenous CMYK half tones;

FIG. 3F shows homogenous special color half tones;

FIG. 3G shows overprinted CMYK half tones; and

FIG. 3H shows overprinted special color half tones.

DETAILED DESCRIPTION OF THE INVENTION

Figure 1:
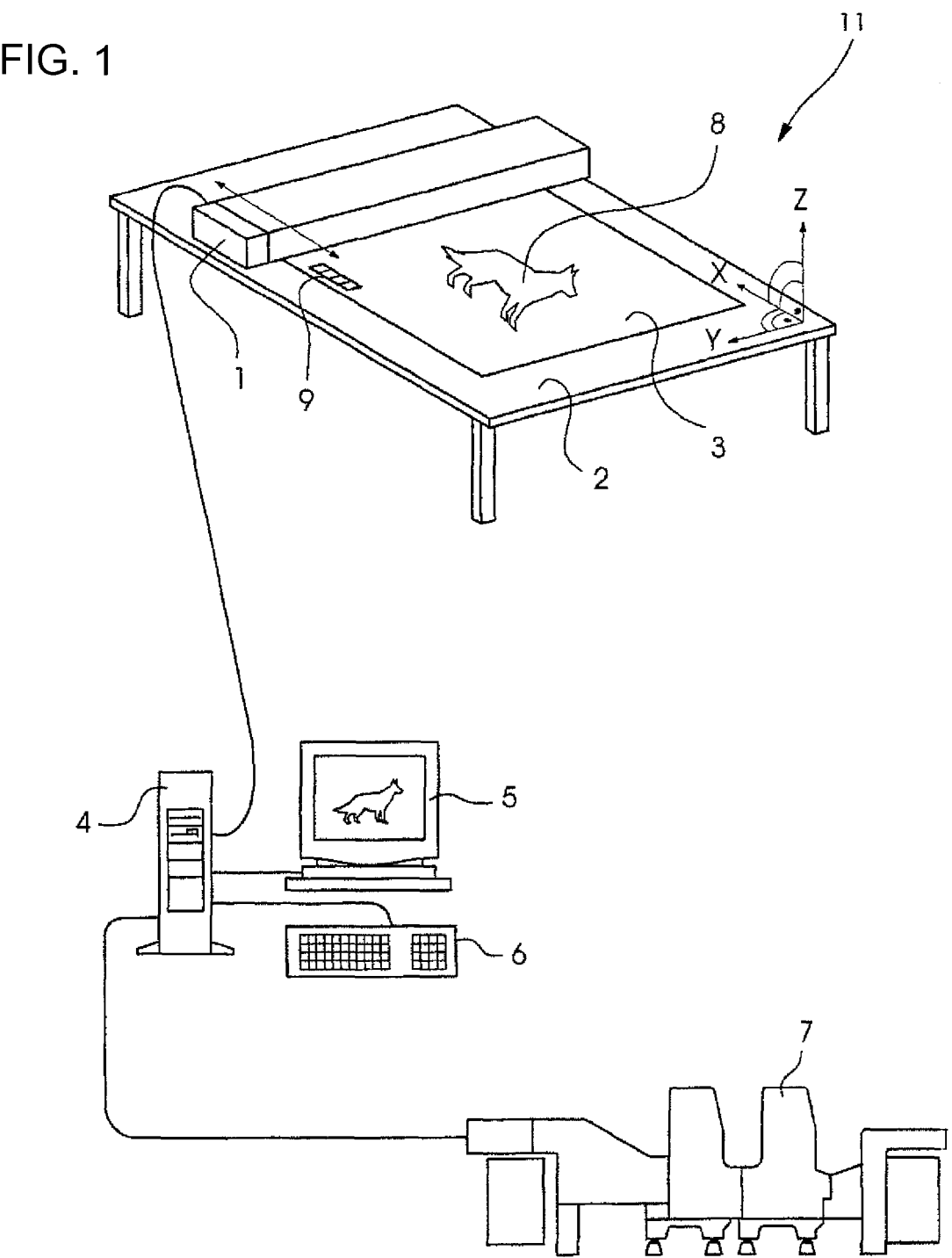
FIG. 1 includes diagrammatic, perspective, front-elevational and side-elevational views of a computer for image analysis, which is networked with a color measuring instrument and an offset printing press.

Referring now to the figures of the drawings in detail and first, particularly, to FIG. 1 thereof, there is seen an offset printing press 7 having two printing units with a control system which is networked with a computer 4. A color measuring instrument 11, which is able to measure sheet printing materials 3 over an area in a scanning operation, is also connected to the computer 4. To this end, a measuring beam 1 constructed as a scanner moves over the entire printed sheet 3 in the x direction and in the process registers both an entire printed image 8 as well as print control strips 9 applied to the sides of the sheet 3. During the measuring operation, the sheet lies on a measuring table 2. In this way, it is possible to register both the entire printed image 8 as well as print control strips 9 applied to the sides in one pass with the scanning measuring beam 1. Data from the printed image 8 and from the print control strip 9 registered in this way can then be transmitted to the computer 4, where actual measured values registered are compared with associated set points. Should deviations between the set points and the actual values occur which are outside a permissible tolerance, appropriate adjustment commands are calculated, in particular for inking units and dampening units in the printing units of the printing press 7, and are sent from the computer 4 to the printing press 7.

The computer 4 also has a screen 5 to display the printed image 8 and to display masks of the machine control system of the printing press 7 and has a keyboard 6 as well as a non-illustrated computer mouse for the entry of operating commands. In the present invention, it is substantially a matter of automatically determining the correct set points, in particular color set points, for the comparison with the actual values registered through the use of the color measuring instrument 11, in particular the actual color values. For this purpose, the computer 4 firstly has access to the digital image data from the original print. To this end, the computer 4 is advantageously linked directly to a computer of a prepress stage and can thus make direct access to the color separations of the original print in the prepress stage. These color separations are analyzed by the computer 4 with regard to different image types and image regions. The computer 4 combines identical image types/image regions and allocates these identical image types/image regions the same set points, in particular color set points. These set points correspond to presetting data for the printing press 7, in particular involving the colors needed for the printing, such as CMYK and any special colors.

Figure 2:
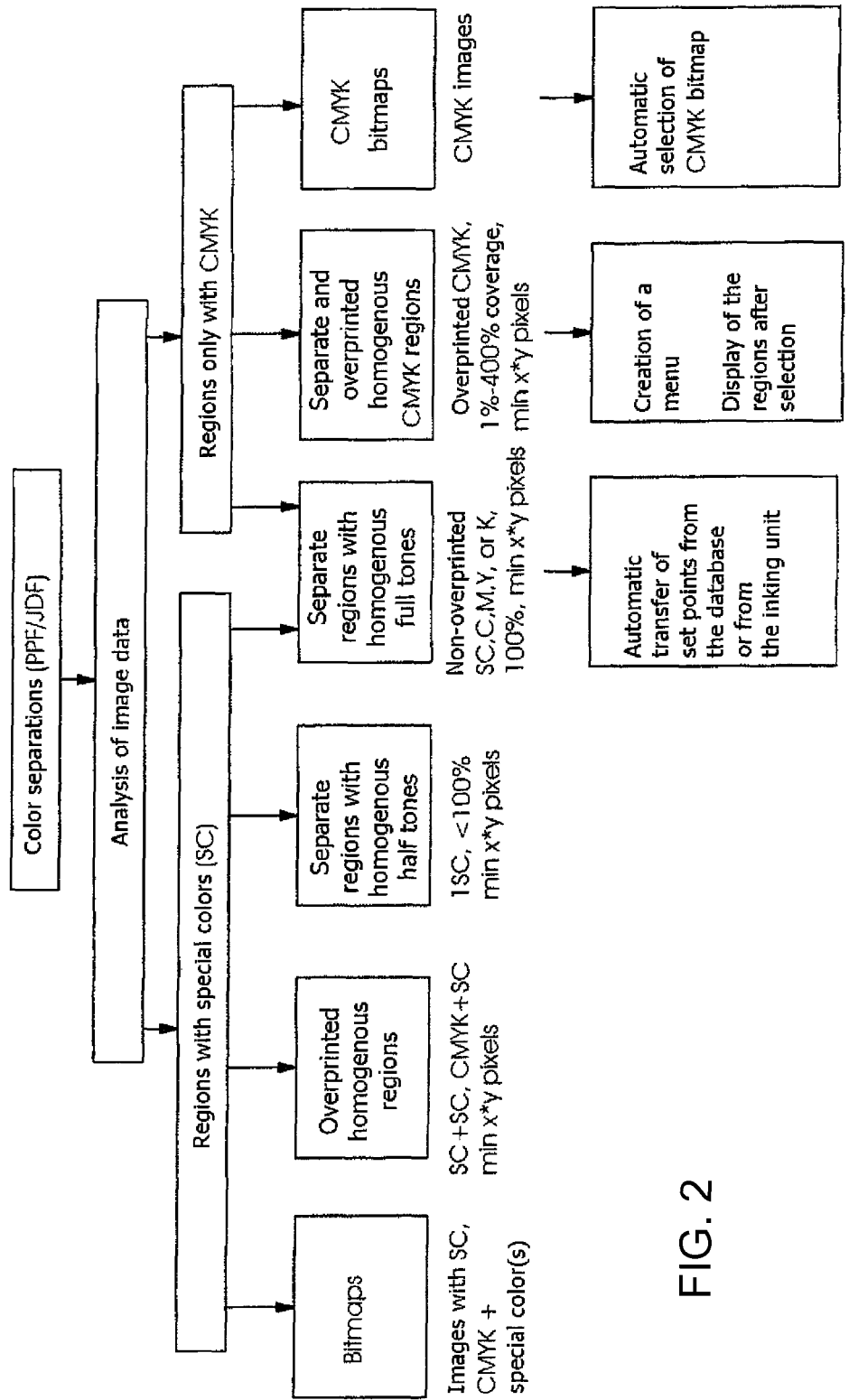
FIG. 2 is a flow chart showing an overview of image types substantially used during image analysis.

FIG. 2 depicts the most important six image types, into which the color separations from the prepress stage, which are present in the JDF format, for example, are organized. Firstly, during the analysis of the digital image data in the computer 4, a subdivision into regions with special colors and into regions with only CMYK colors is carried out. Each of the two color regions is then once more subdivided into the regions including bitmaps, overprinted homogenous regions and homogenous half tones. It is possible, at least in the case of the regions having homogenous full tones, to transfer set points from the matching color automatically, so that the set points from the ink setting or from the inking unit of the printing press 7 can be transferred directly. In the case of the overprinted homogenous CMYK regions, it is advantageous that a menu is firstly created on the screen 5 and the regions are displayed on the screen 5. Thus, the printer can, as appropriate, confirm or change the selection directly on the screen. In the case of the bitmaps, an automatic selection can likewise be carried out or the printer is given the possibility of allocating by hand the bitmap in the printed image 8, marked on the screen 5. To this end, he or she can fall back on suggestions drawn by the computer 4 from a database, in which the corresponding set points are stored.

Figure 3:
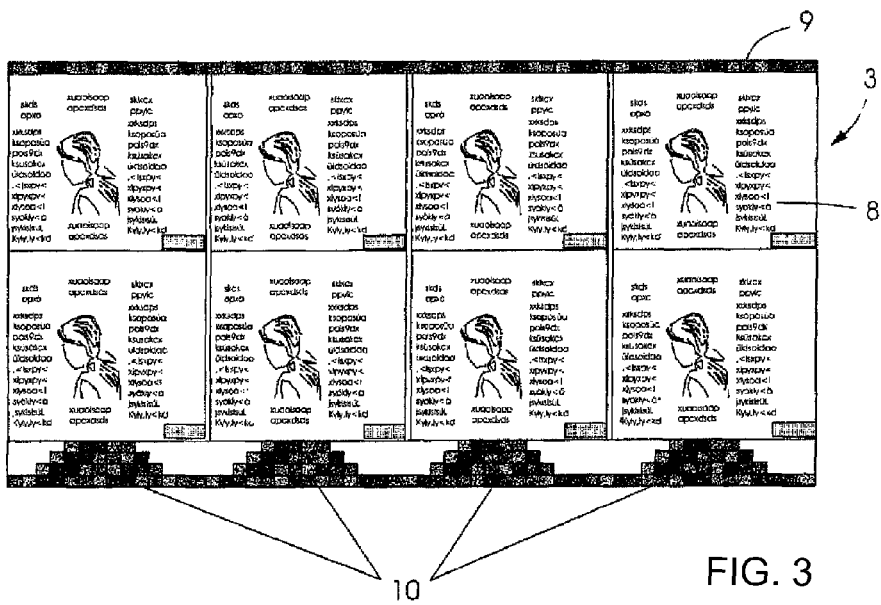
FIG. 3 shows a printed sheet having a number of copies.

FIG. 3 shows, by way of example, a sheet printing material 3 which is produced in the printing press 7 and which is measured on the color measuring instrument 11. It can be seen that the printing material 3 further contains print control strips or elements 9, 10 in addition to the printed image 8. The print control strips 9 are accommodated at the side outside the printed image 8, while so-called mini print control strips 10 are accommodated in the printed image 8 itself. The printed image 8 on the sheet 3 in FIG. 3 in this case contains eight copies, as they are known. This means that, after the printing, the sheet 3 is cut up into these eight copies. Each of the copies is identical and, in particular, in the color reproduction during printing, should also be reproduced identically, so that each copy appears the same.

Figure 3A:
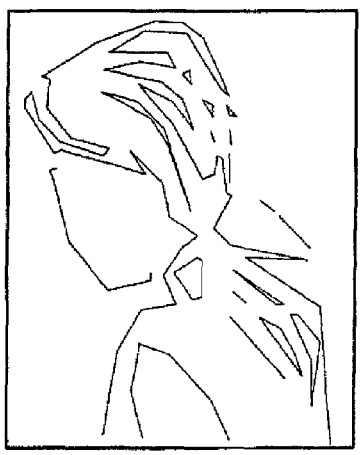
FIG. 3A shows a CMYK bitmap.
Figure 3B:
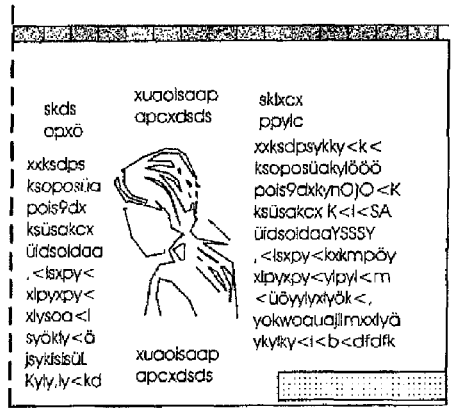
FIG. 3B shows a bitmap with special colors.

FIG. 3A reveals an extract from a copy, which is present in the form of a CMYK bitmap. This means that this extract is formed only of the colors cyan, magenta, yellow and black. FIG. 3B, on the other hand, reveals an extract from a copy which is formed of a bitmap having special colors. FIG. 3C shows an image extract having homogenous CMYK colors in the full tone, while FIG. 3E shows an image extract having homogenous CMYK colors as half tones, for example a 50% half tone. FIG. 3G shows, by way of example, an extract in which a plurality of CMYK half tones are overprinted, with the uppermost square containing 50% cyan, 40% magenta, 40% yellow and no proportion of black, while the middle square contains 30% cyan, 80% magenta, 100% yellow and a 20% proportion of black, and the lowest square contains 100% cyan, 0% magenta, 100% yellow and no proportion of black.

In the right-hand column, FIG. 3D shows a homogenous image region having special colors in the full tone, while FIG. 3F represents a homogenous image region having special colors in half tones, in this case a 50% half tone once more being reproduced as an example. FIG. 3H in turn shows overprinted half tones of special colors, which can also be combined with CMYK colors. Thus, the uppermost square shows the special color 50% Pantone 471 with a 30% proportion of black, while the lower square shows a special color 50% Pantone 471 with 20% special color Pantone Reflex Blue.

The computer 4 ensures that each of the image types in FIGS. 3A to 3H is respectively allocated the correct set points as reference variable for the actual values registered by the color measuring instrument 11. Therefore, wrong entries by the printer are avoided and erroneous color control, which would not lead to color reproduction of the image data from the prepress stage that was true to the original, is avoided.

The invention claimed is:

1. A method for registering color deviations on printing materials produced in printing material processing machines having prepress stages, the method comprising the following steps:

registering actual values on the printing materials being produced with a color measuring instrument;

analyzing image data of a print original from the prepress stage with regard to coloring in a printed image on the printing materials, with a computer; and during the analysis in the computer, organizing the image data from the prepress stage into image types, allocating set points to the image types and correspondingly comparing the set points with the actual values registered by the color measuring instrument on the printing materials being produced.

2. The method according to claim 1, wherein the image types are regions selected from the group consisting of bitmaps, homogenous color regions, homogenous half tones, homogenous full tones, overprinted homogenous full tones and CMYK bitmaps.

3. The method according to claim 1, which further comprises using the analyzed image data and the organization into image types in the computer to perform an evaluation with regard to setting of dampening solution metering in a printing press producing the printing materials and to make any necessary correction of the dampening solution metering.

4. The method according to claim 1, which further comprises allocating correct set points to the image types in the computer by using a comparison with values stored in a database.

5. The method according to claim 4, wherein the set points are matching printing ink.

6. The method according to claim 4, which further comprises providing the computer with a display device, and displaying a menu for the allocation of the set points for the determined image types on the display device.

7. The method according to claim 1, wherein the color measuring instrument is an in-line, off-line or online measuring instrument measuring an area to register the printed image on the printing materials.

8. The method according to claim 1, which further comprises carrying out the analysis of the image data in the computer on the basis of the color separations in the prepress stage.

9. The method according to claim 8, which further comprises analyzing area coverages of individual color separations in the printed image during the analysis of the image data.

10. The method according to claim 1, which further comprises providing the computer with a display device, displaying the printed image, at least schematically, on the display device, and emphasizing image regions organized into image types through markings on the display device.

11. The method according to claim 1, which further comprises marking homogenous image regions automatically from a given size and displaying the homogenous image regions in a list in accordance with a respectively largest frequency in the printed image on the printing material.

12. The method according to claim 11, wherein the homogenous image regions have CMYK colors.

* * * * *